United States Patent
Su

(10) Patent No.: US 10,263,517 B2
(45) Date of Patent: Apr. 16, 2019

(54) VOLTAGE BOOSTING CIRCUIT CAPABLE OF MODULATING DUTY CYCLE AUTOMATICALLY

(71) Applicant: SITRONIX TECHNOLOGY CORP., Jhubei (TW)

(72) Inventor: Chung-Hsin Su, Jhubei (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 15/959,424

(22) Filed: Apr. 23, 2018

(65) Prior Publication Data
US 2018/0241309 A1    Aug. 23, 2018

Related U.S. Application Data

(62) Division of application No. 14/049,439, filed on Oct. 9, 2013.

(30) Foreign Application Priority Data

Aug. 19, 2013    (TW) .............................. 102129689 A

(51) Int. Cl.
*H02M 3/156*    (2006.01)

(52) U.S. Cl.
CPC .................................. *H02M 3/156* (2013.01)

(58) Field of Classification Search
CPC .................................................... H02M 3/156
USPC ....... 323/222, 234, 237, 246, 282, 283, 284, 323/285
See application file for complete search history.

(56) References Cited

U.S. PATENT DOCUMENTS

| | | | | |
|---|---|---|---|---|
| 2005/0116698 A1* | 6/2005 | Prinz | ..................... | H02M 3/157 323/283 |
| 2009/0323375 A1* | 12/2009 | Galvano | ................ | H02M 3/156 363/21.06 |
| 2011/0057637 A1* | 3/2011 | Liu | ......................... | H02M 3/156 323/287 |
| 2011/0160806 A1* | 6/2011 | Lyden | ....................... | A61N 1/08 607/63 |
| 2012/0098514 A1* | 4/2012 | Wang | ..................... | H02M 3/156 323/285 |
| 2012/0176105 A1* | 7/2012 | Chang | .................. | H02M 3/1584 323/237 |
| 2012/0229110 A1* | 9/2012 | Huang | ................. | H02M 3/1582 323/282 |

(Continued)

*Primary Examiner* — Alex Torres-Rivera
(74) *Attorney, Agent, or Firm* — Rosenberg, Klein & Lee

(57) ABSTRACT

The present invention relates to a voltage boosting circuit capable of modulating duty cycle automatically, which comprises an inductor, a switching module, and a control circuit. The inductor is coupled to an input for receiving an input power. The switching module is coupled among the inductor, a ground, and an output for switching so that the input power can charge the inductor and produce charged energy, or for switching so that the charged energy of the inductor can discharge to the output and produce an output voltage. The control circuit outputs at least a control signal according to the charged energy and the output voltage for controlling the switching module to switch the inductor and provide the input power to the output, to switch the charged energy of the inductor to discharge to the output, or to switch the input power to charge the inductor.

14 Claims, 16 Drawing Sheets

(56) References Cited

U.S. PATENT DOCUMENTS

2014/0191742 A1* 7/2014 Kung .................. G05F 1/10
                                                    323/282
2014/0197809 A1* 7/2014 Chen .................. H02M 3/07
                                                    323/271

* cited by examiner

VOLTAGE BOOSTING CIRCUIT CAPABLE OF MODULATING DUTY CYCLE AUTOMATICALLY

CROSS-REFERENCE TO RELATED APPLICATION

This Application is being filed as Divisional Application of Ser. No. 14/049,439, filed on 9 Oct. 2013, currently pending, which claims the benefit of Taiwan Patent Application No. 102129689, filed on 19 Aug. 2013, which is incorporated by reference herein.

FIELD OF THE INVENTION

The present invention relates generally to a voltage boosting circuit, and particularly to a voltage boosting circuit capable of modulating duty cycle automatically.

BACKGROUND OF THE INVENTION

Modern technologies are developing prosperously. Novel information products are introduced frequently for satisfying people's various needs. Most of the early displays are cathode ray tube (CRT) displays. Owing to their huge size, tremendous power consumption, and radiation threats to the health of long-term users, current commercial displays are gradually replaced by liquid crystal displays (LCDs). LCDs have the advantages of small size, low radiation, and low power consumption, making them become the mainstream in the market.

LCDs display images by controlling the transmissivity of liquid crystal cells according to data signals. Active-matrix LCDs adopt active control of switching devices. Thereby, they are beneficial in displaying motion pictures. Thin film transistors (TFTs) are mainly applied to related device of active-matrix LCDs.

Please refer to FIG. 1, which shows a schematic diagram of the displaying device according to the prior art. As shown in the figure, the displaying device comprises a display panel 10, a data driving circuit 14, and a charge pump 16. The data driving circuit 14 comprises a plurality of digital-to-analog converting circuits (DAC) 141 and a plurality of operational amplifiers 143. The plurality of digital-to-analog converting circuits 141 produce a selecting voltage Vsel to the plurality of operational amplifiers 143, respectively. The plurality of operational amplifiers 143 generate a plurality of driving signals SL to a plurality of equivalent capacitors C of the display panel 10 according to the selecting voltage Vsel, respectively, for driving the display panel to display images. The charge pump 16 is connected to the differential circuits 1431 of the plurality of operational amplifiers 143 and the driving circuits simultaneously, and supplies a fixed supply voltage VP to the differential circuits 1431 and the driving circuits 1433 according to a reference voltage VDD to make them operate.

According to the above description, the charge pump 16 of the displaying device according to the prior art provides the fixed supply voltage VP to the differential circuits 1431 and the driving circuits 1433, so that the operational amplifiers 143 can generate the plurality of driving signals SL. Nonetheless, the shortcoming of this method is that no matter the voltage required by the plurality of equivalent capacitors C of the display panel is greater or smaller than the reference voltage VDD, the charge pump 16 provides invariably the supply voltage VP to the plurality of operational amplifiers 143. Thereby, when no excessively high supply voltage VP is required, that excessively high supply voltage VP results in excess power consumption.

Accordingly, for solving the problem described above, the present invention provides a voltage boosting circuit capable of modulating duty cycle automatically, which supplies the power required by a loading by charging and discharging an inductor and modulating the duty cycle automatically according to the power required by the loading. Thereby, the purposes of reducing excess power consumption and saving power can be achieved.

SUMMARY

An objective of the present invention is to provide a voltage boosting circuit capable of modulating duty cycle automatically, which supplies the power required by a loading by charging and discharging an inductor and modulating the duty cycle automatically according to the power required by the loading. Thereby, the purpose of saving power can be achieved.

Another objective of the present invention is to provide a voltage boosting circuit capable of modulating duty cycle automatically, which judges if the inductor in the voltage boosting circuit has completed discharging according to the output current or output voltage of the inductor during discharging. Besides, the discharging time of the inductor is adjusted automatically according to the power required by the loading for reducing the power consumption of the voltage boosting circuit and achieving the purpose of saving power.

Still another objective of the present invention is to provide a voltage boosting circuit capable of modulating duty cycle automatically, which judges if the inductor in the voltage boosting circuit has completed charging according to the charging current of the inductor during charging. Besides, the charging time of the inductor is adjusted automatically according to the power required by the loading for reducing the power consumption of the voltage boosting circuit and achieving the purpose of saving power.

A further objective of the present invention is to provide a voltage boosting circuit capable of modulating duty cycle automatically, which knows the charged energy stored in the inductor in the voltage boosting circuit by detecting the output current of the inductor during discharging. Besides, the charging time of the inductor is adjusted automatically according to the power required by the loading for reducing the power consumption of the voltage boosting circuit and achieving the purpose of saving power.

For achieving the purposes and effects described above, the present invention discloses a voltage boosting circuit capable of modulating duty cycle automatically, which comprises an inductor, a switching module, and a control circuit. The inductor has a first terminal and a second terminal. The first terminal of the inductor is coupled to an input for receiving an input power. The switching module is coupled among the second terminal of the inductor, a ground, and an output of the voltage boosting circuit for switching and conducting the second terminal of the inductor to the ground so that the input power can charge the inductor and produce charged energy, or for switching and conducting the second terminal of the inductor to the output so that the charged energy of the inductor can discharge to the output and produce an output voltage. The control circuit outputs at least a control signal according to the capacity of the charged energy and the output voltage for controlling the switching module to switch the inductor and provide the input power to the output, to switch the charged energy of the inductor to discharge to the output, or to switch the input power to charge the inductor.

The present invention further discloses a voltage boosting circuit capable of modulating duty cycle automatically, which comprises an inductor, a switching module, and a control circuit. The inductor has a first terminal and a second terminal. The first terminal of the inductor is coupled to a ground. The switching module is coupled among the second terminal of the inductor, an input, and an output of the voltage boosting circuit for switching and conducting the second terminal of the inductor to the input so that the inductor can receive the input power for charging and producing charged energy, or for switching and conducting the second terminal of the inductor to the output so that the charged energy of the inductor can discharge to the ground and produce an output voltage. The control circuit outputs at least a control signal according to the capacity of the charged energy and the output voltage for controlling the switching module to switch the output to discharge to the ground, to switch the charged energy of the inductor to discharge to the ground, or to switch the input power to charge the inductor.

DETAILED DESCRIPTION

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Beside, the word "couple" includes any direct and indirect electrical connection. Thereby, if the description is that a first device is coupled to a second device, it means that the first device is connected electrically to the second device directly, or the first device is connected electrically to the second device via other device or connecting means indirectly.

In order to make the structure and characteristics as well as the effectiveness of the present invention to be further understood and recognized, the detailed description of the present invention is provided as follows along with embodiments and accompanying figures.

Figure 1:
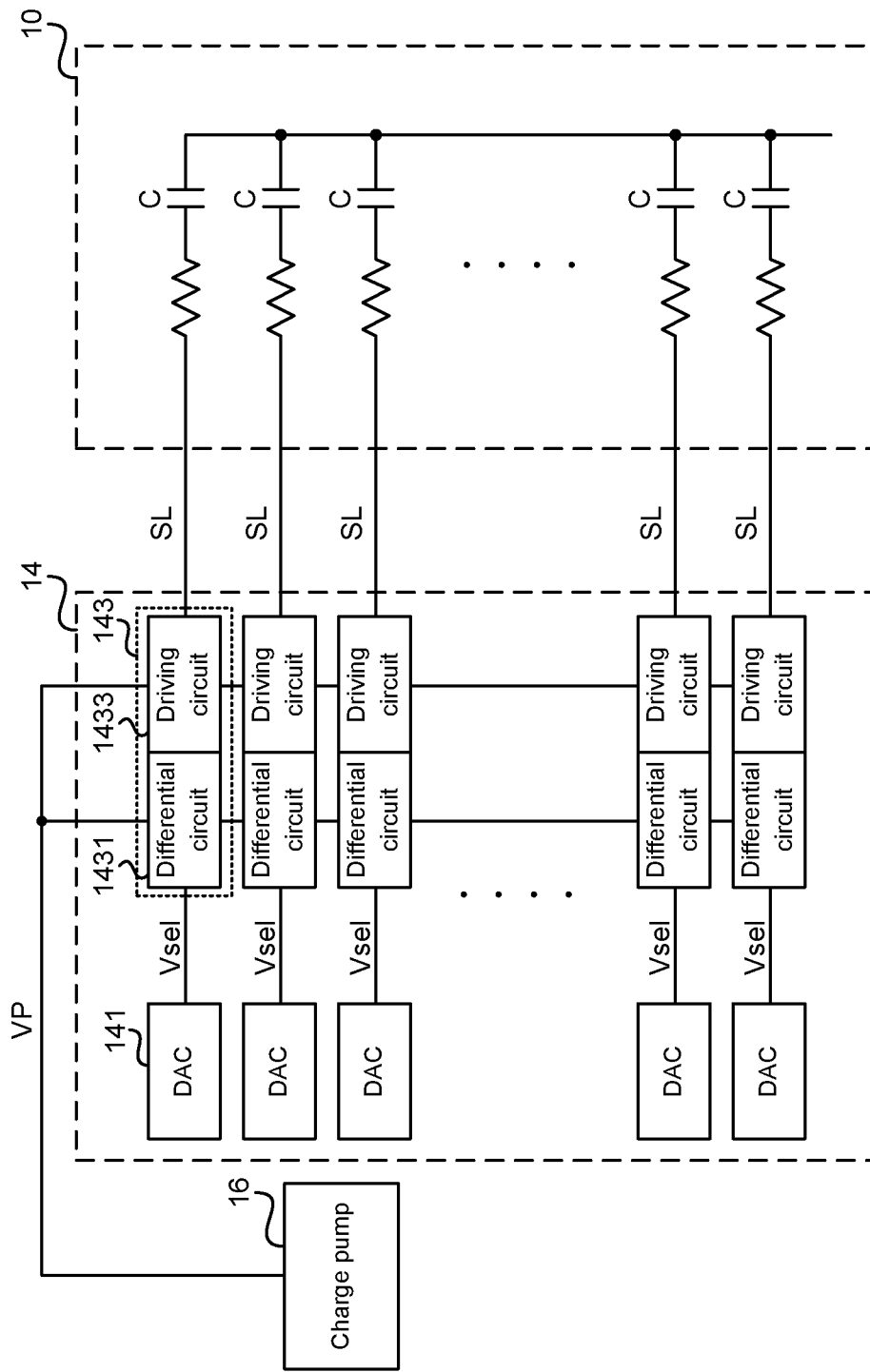
FIG. 1 shows a schematic diagram of the displaying device according to the prior art.
Figure 2:
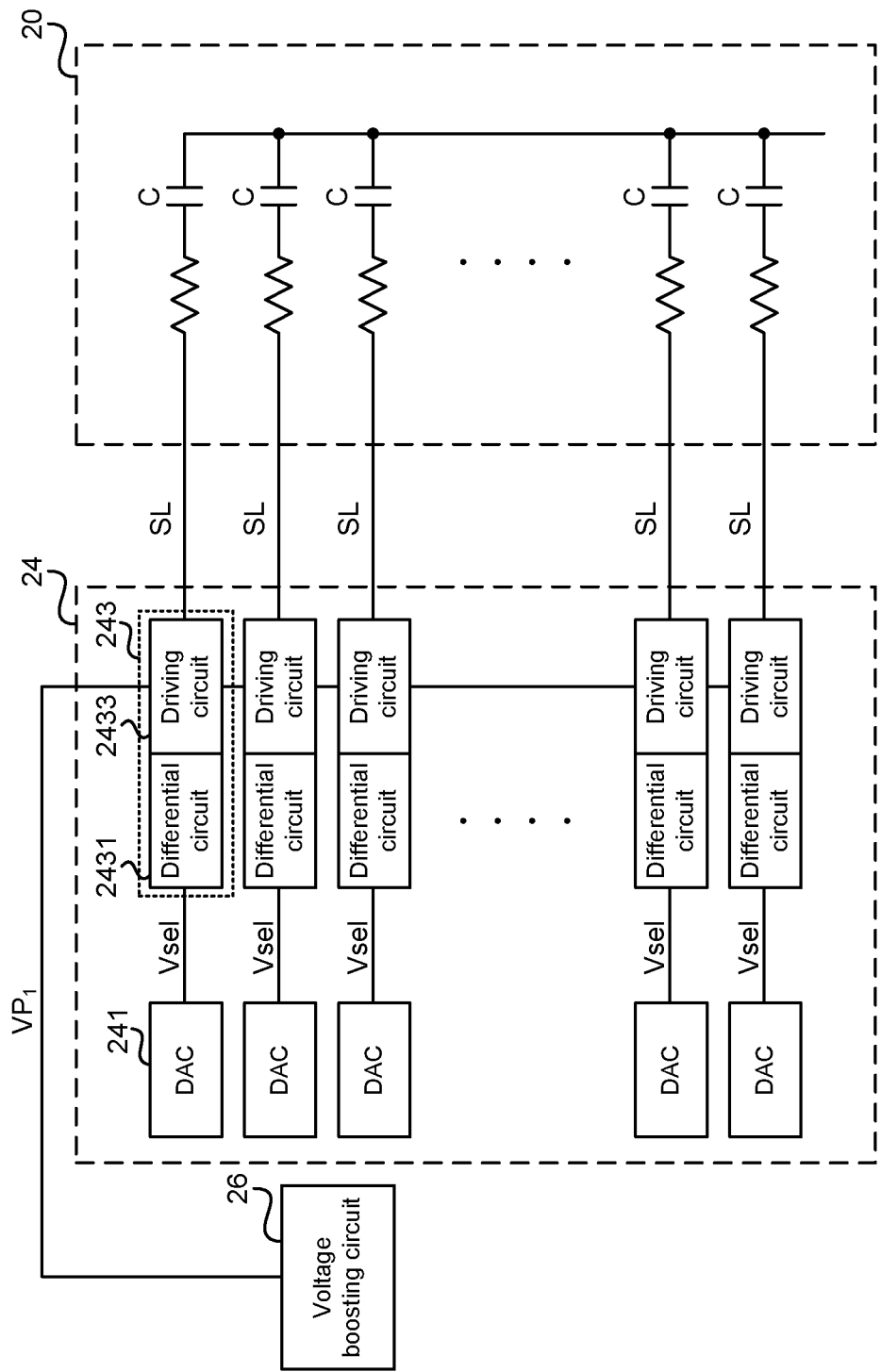
FIG. 2 shows a schematic diagram of the displaying device according a preferred embodiment of the present invention.

Please refer to FIG. 2, which shows a schematic diagram of the displaying device according a preferred embodiment of the present invention. As shown in the figure, the displaying device comprises a display panel 20, a data driving circuit 24, and a voltage boosting circuit 26. The data driving circuit 24 comprises a plurality of digital-to-analog converting circuits (DAC) 241 and a plurality of operational amplifiers 243. The plurality of digital-to-analog converting circuits 241 produce a selecting voltage Vsel to the plurality of operational amplifiers 243, respectively. The plurality of operational amplifiers 243 generate a plurality of driving signals SL to a plurality of equivalent capacitors C of the display panel 20 according to the selecting voltage Vsel, respectively, for driving the display panel to display images. The voltage boosting circuit 26 is connected to the driving circuits 2433 of the plurality of operational amplifiers 243 only and supplies a supply voltage $VP_1$ to the driving circuits 2433 to make them operate; the voltage boosting circuit 26 is connected to differential circuits 2431. In addition, the differential circuits 2431 of the operational amplifiers 243 and the digital-to-analog converting circuits 241 operate according to other power supplies.

Figure 3:
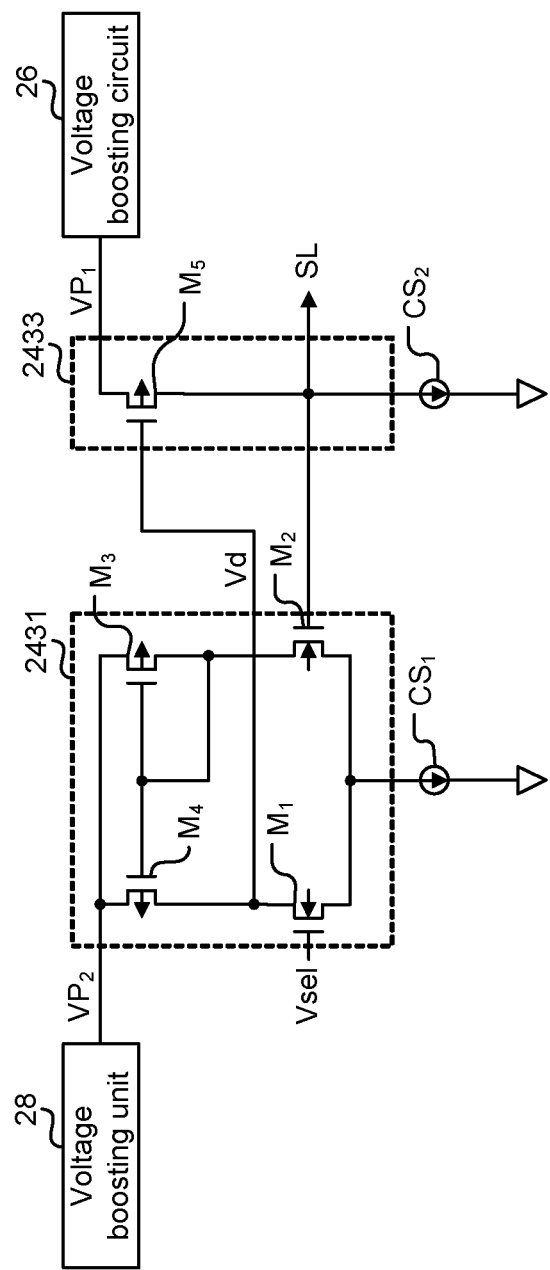
FIG. 3 shows a circuit diagram of the operational amplifier according to a preferred embodiment of the present invention.

Please refer to FIG. 3, which shows a circuit diagram of the operational amplifier according to a preferred embodiment of the present invention. As shown in the figure, the differential circuit 2431 of the operational amplifier 243 comprises a plurality of transistors $M_1$~$M_4$ coupled to a voltage boosting unit 28 and a current source $CS_1$ and outputting a supply voltage $VP_2$ and the selecting voltage Vsel according to the voltage boosting unit 28 for producing a differential voltage Vd. The driving circuit 2433 of the operational amplifier 243 comprises a transistor $M_5$ coupled to a voltage boosting circuit 26 and a current source $CS_2$ and producing the driving signal SL according to the supply voltage $VP_1$ output by the voltage boosting circuit 26 and the differential voltage Vd for driving the display panel 20 to display images. Accordingly, the voltage boosting circuit 26 is coupled to the driving circuits 2433 of the operational amplifiers 243 only but not to the differential circuits 2431.

Besides, when the operational amplifier 243 generates the driving signal SL, the differential circuit 2431 outputs the differential signal Vd to the transistor $M_5$ and turns on the transistor $M_5$. Then the supply voltage $VP_1$ can be provided directly to the driving signal SL to enable the level of the driving signal SL output by the operational amplifier 243 to reach the level required by the loading (for example, the plurality of equivalent capacitors C of the display panel 20).

Figure 4:
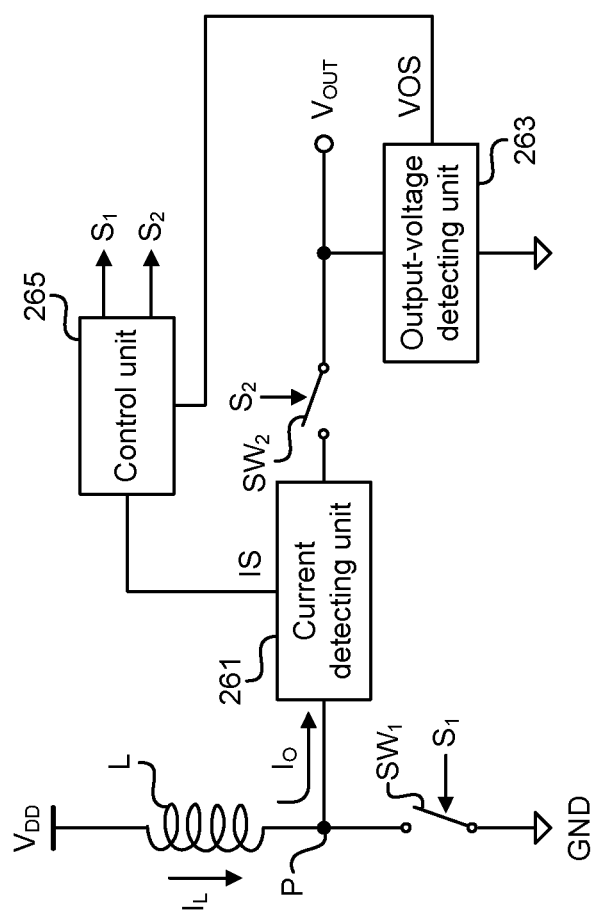
FIG. 4 shows a circuit diagram of the voltage boosting circuit capable of modulating duty cycle automatically according to the first embodiment of the present invention.

Please refer to FIG. 4, which shows a circuit diagram of the voltage boosting circuit capable of modulating duty cycle automatically according to the first embodiment of the present invention. As shown in the figure, the voltage boosting circuit 26 comprises an inductor L, a switching module, and a control circuit. A first terminal of the inductor L is coupled to an input of the voltage boosting circuit 26 for receiving an input power $V_{DD}$. The switching module is used for switching and conducting the second terminal of the inductor L to the ground GND so that the input power $V_{DD}$ can charge the inductor L and produce charged energy, or for switching and conducting the second terminal of the inductor L to the output of the voltage boosting circuit 26 so that the charged energy of the inductor L can discharge to the output and produce an output voltage $V_{OUT}$. The control circuit outputs at least a control signal according to the capacity of the charged energy and the output voltage $V_{OUT}$ for controlling the switching module to switch the inductor L and provide the input power $V_{DD}$ to the output, to switch the charged energy of the inductor L to discharge to the output, or to switch the input power $V_{DD}$ to charge the inductor L. The output voltage $V_{OUT}$ can be used as, but not limited to, the supply voltage $VP_1$ in FIG. 3.

According to the present embodiment, the switching module comprises a plurality of switches $SW_1$, $SW_2$. The switch $SW_1$ is coupled between the second terminal of the inductor L and the ground GND and connects electrically the second terminal of the inductor L to the ground GND according to a switching signal $S_1$ of the control signal. The switch $SW_2$ is coupled to the second terminal of the inductor L and the output of the voltage boosting circuit 26 and connects electrically the second terminal of the inductor L to the output of the voltage boosting circuit 26 according to a switching signal $S_2$ of the control signal. The control circuit comprises a current detecting unit 261, an output-voltage detecting unit 263, and a control unit 265. The current detecting unit 261 is used for detecting an output current $I_O$ between the second terminal of the inductor L and the output of the voltage boosting circuit 26 for knowing the capacity of the charged energy in the inductor L. The current detecting unit 261 also generates a current detecting signal IS according to the output current $I_O$. In other words, the current detecting unit 261 detects the output current $I_O$ for generating the current detecting signal IS. The output-voltage detecting unit 263 is used for detecting the output voltage $V_{OUT}$ and generates an output-voltage detecting signal VOS according to the output voltage $V_{OUT}$. The control unit 265 receives the current detecting signal IS and the output-voltage detecting signal VOS and outputs the control signal according to the current detecting signal IS and the output-voltage detecting signal VOS. The control signal includes the switching signals $S_1$, $S_2$. Namely, the control unit 265 controls the switching of the switching signals $S_1$, $S_2$ according to the current detecting signal IS and the output-voltage detecting signal VOS.

Figure 5:
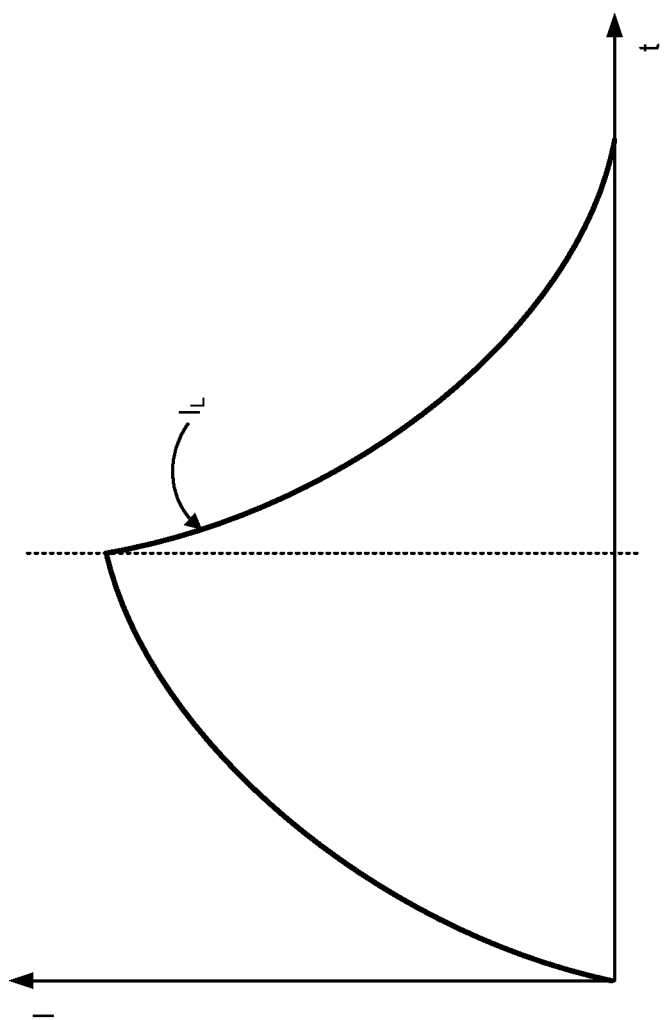
FIG. 5 shows a waveform of the charging current of the inductor according to the present invention.

Please refer to FIG. 5, which shows a waveform of the charging current of the inductor according to the present invention. As shown in the figure, when the inductor L is being charged, the inductor L starts to store the charged energy. In other words, a current $I_L$, as shown in FIG. 4, starts to increase gradually until the rated value of the charged energy of the inductor L. When the inductor L starts discharging, at the transient of discharging, an extremely high voltage will occur across the inductor L. If a discharge path appears, the charged energy stored in the inductor L will start to be released via the discharge path. That is to say, the stored current in the inductor L will start to decrease gradually until the stored current is released completely. Thereby, according to the present embodiment, by using the characteristics of the inductor L, this current $I_L$ (which is converted to the output current $I_O$ in FIG. 4) is detected for judging if the inductor L has completed discharging. Then the discharging time of the inductor can be adjusted automatically according to the power required by the loading for reducing the power consumption of the voltage boosting circuit and saving power. In the following, how to module the duty cycle by means of the characteristics of the inductor L for supplying the power required by the loading is described in details.

Figure 6:
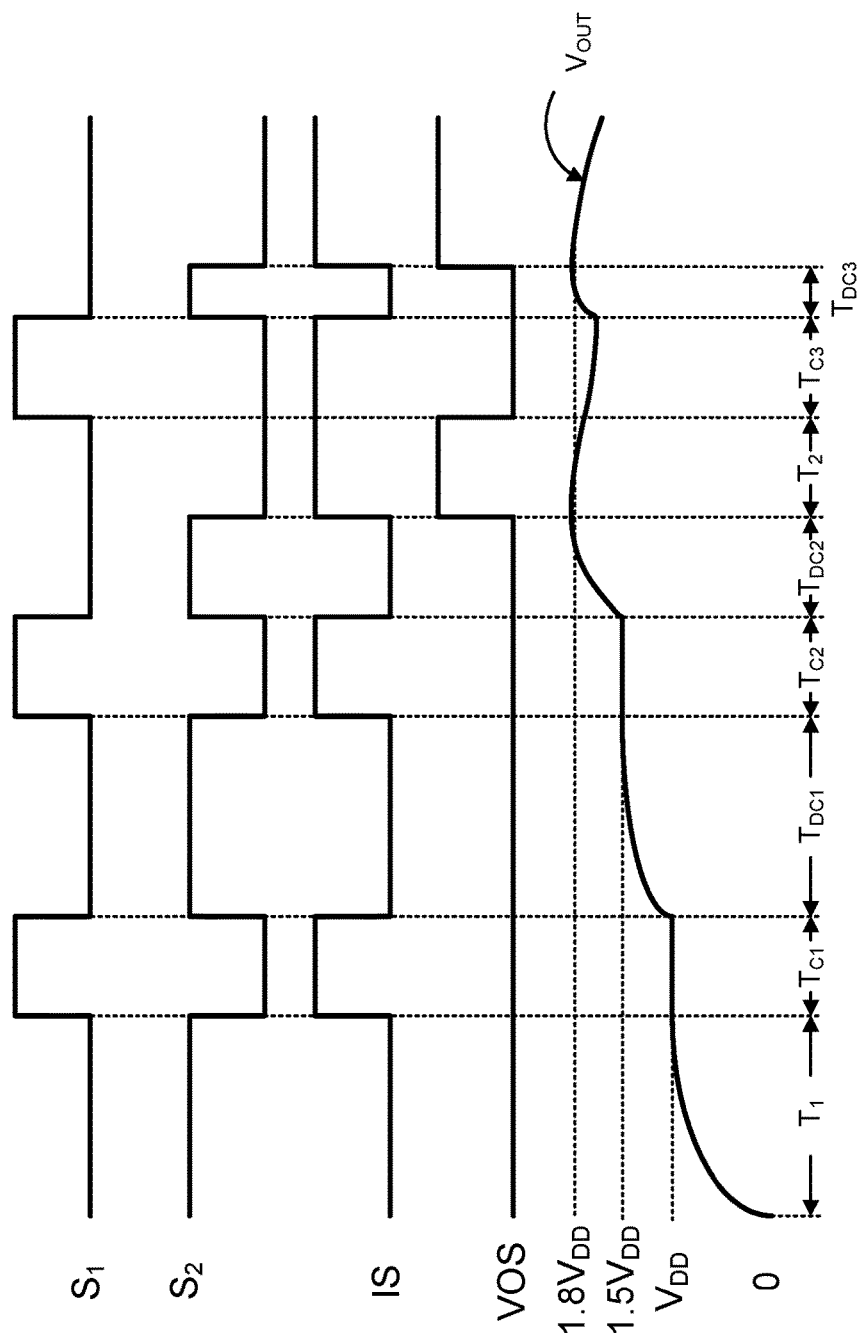
FIG. 6 shows waveforms of the voltage boosting circuit capable of modulating duty cycle automatically according to the first embodiment of the present invention.

Please refer to FIG. 6, which shows waveforms of the voltage boosting circuit capable of modulating duty cycle automatically according to the first embodiment of the present invention. As shown in the figure, initially, because the output voltage $V_{OUT}$ is lower than the input power $V_{DD}$, the control unit 265 outputs the low-level switching signal $S_1$ and the high-level switching signal $S_2$ for turning off the switch $SW_1$ and turning on the switch $SW_2$. Thereby, in the time $T_1$, the input power $V_{DD}$ is output directly to the output and producing the output voltage $V_{OUT}$. For the embodiment in FIGS. 2 and 3, the output voltage $V_{OUT}$ is used as the supply voltage $VP_1$ and is converted to the driving signal SL by the driving circuit 2433 for charging the equivalent capacitor C of the display panel 20. Thereby, the output voltage $V_{OUT}$ will be charged to the level of the input power $V_{DD}$.

Next, when the output voltage $V_{OUT}$ is charged to the level of the input power $V_{DD}$, because the voltage levels of the input and the output are identical, there will be no current flowing through. Hence, the output current $I_O$ detected by the current detecting unit 261 is 0 A, and the current detecting unit 261 outputs the high-level current detecting signal IS to make the control unit 265 output the high-level switching signal $S_1$ and the low-level switching signal $S_2$ for turning on the switch $SW_1$ and turning off the switch $SW_2$. Then the input power $V_{DD}$ charges the inductor L for a charging time $T_{C1}$ to store the charged energy to the inductor L. As the charging is finished, the switching signal $S_1$ is changed to low and the switching signal $S_2$ is changed to high for turning off the switch $SW_1$ and turning on the switch $SW_2$. In the discharging time $T_{DC1}$, the charged energy in the inductor L starts to discharge to the output; at the transient when the switch $SW_1$ is turned off, the voltage level at the node P will increase rapidly. When the switch $SW_2$ is turned on, the charged energy in the inductor L starts to discharge to the output and decreases gradually as discharging to the output. As the inductor L discharges, the output voltage at the output $V_{OUT}$ is charged gradually and increases. In addition, according to the Lenz's Law, when the inductor L is discharged completely, namely, when the output current $I_O$ is zero, the voltage level at the node P will be identical to the level of the output voltage $V_{OUT}$, which is 1.5 times the input power $V_{DD}$ according to the present embodiment. In practice, the voltage level at the node P is determined by the inductance of the inductor L and the loading at the output.

When the voltage level at the node P is identical to the level of the output voltage $V_{OUT}$, the output current $I_O$ detected by the current detecting unit 261 is 0 A, which makes the control unit 265 to turn on the switch $SW_1$ and turn off the switch $SW_2$ via the switching signals $S_1$, $S_2$. Then the input power $V_{DD}$ charges the inductor L for a charging time $T_{C2}$. After charging, the switching signal $S_1$ is changed to low and the switching signal $S_2$ is changed to high for turning off the switch $SW_1$ and turning on the switch $SW_2$. Afterwards, in a discharging time $T_{DC2}$, the inductor L discharges to the output. According to the present embodiment, a predetermined voltage is 1.8 times the input power $V_{DD}$. Thereby, when the output voltage increases to greater than 1.8 times the input power $V_{DD}$, the output-voltage detecting unit 263 outputs the high-level output-voltage detecting signal VOS, which makes the control unit 265 to output low-level switching signals $S_1$, $S_2$ simultaneously for turning off the switches $SW_1$, $SW_2$ at the same time. Then the charging and discharging of the voltage boosting circuit 26 is stopped and entering a stop time $T_2$.

In the stop time $T_2$, the voltage boosting circuit 26 does not charge or discharge. If there is power consumption at the output, the output voltage $V_{OUT}$ will decrease gradually. As the output voltage $V_{OUT}$ is lower than the predetermined voltage, the output-voltage detecting unit 263 changes the output-voltage detecting signal VOS to low according to the output voltage $V_{OUT}$. Thereby, the switching signal $S_1$ is changed to high and the switching signal $S_2$ is kept low for turning on the switch $SW_1$ and turning off the switch $SW_2$. After the input power $V_{DD}$ restarts charging the inductor L for a charging time $T_{C3}$, the switching signal $S_1$ is changed to low and the switching signal $S_2$ is kept high and entering a discharging time $T_{DC3}$, in which the inductor L discharges to the output until the output voltage $V_{OUT}$ is higher than the predetermined voltage again. Then, the output-voltage detecting signal VOS is changed to high for turning off the switches $SW_1$, $SW_2$ again.

According to the above description, the voltage boosting circuit 26 according to the present embodiment uses the fixed predetermined charging times $T_{C1}$, $T_{C2}$, $T_{C3}$ to charge the inductor L to the same charged energy. In addition, in each of the discharging times $T_{DC1}$, $T_{DC2}$, $T_{DC3}$, the charge energy is discharged completely to the output. As the output voltage $V_{OUT}$ increases gradually, each of the discharging times $T_{DC1}$, $T_{DC2}$, $T_{DC3}$ becomes shorter. Moreover, the following equation can be given:

$$\frac{V_{OUT}}{V_{DD}} = \frac{TS}{TS_{1off}} = \frac{1}{1-D} \quad (1)$$

TS is the period of each charging-discharging cycle and equal to, for example, $T_{C1}+T_{DC1}$ or $T_{C2}+T_{DC2}$. $TS_{1off}$ is the discharging time corresponding to the charging-discharging cycle TS, for example, $T_{DC1}$ or $T_{DC2}$. D is the percentage of charging time in each charging-discharging cycle. For example, D is the percentage of $T_{C1}$ in $T_{C1}+T_{DC1}$.

Figure 7:
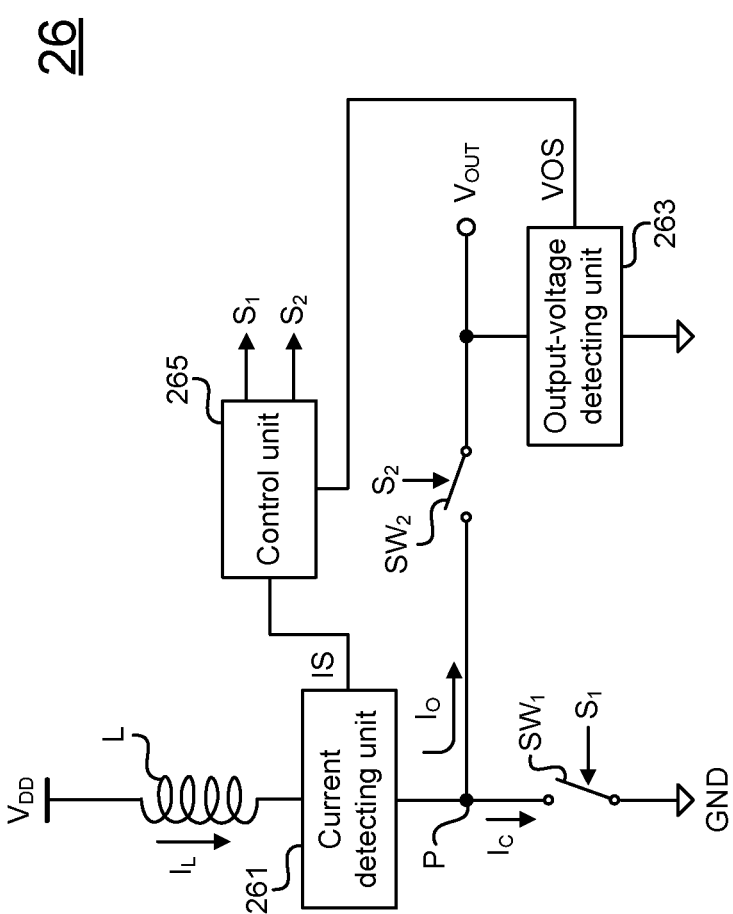
FIG. 7 shows a circuit diagram of the voltage boosting circuit capable of modulating duty cycle automatically according to the second embodiment of the present invention.

Please refer to FIG. 7, which shows a circuit diagram of the voltage boosting circuit capable of modulating duty cycle automatically according to the second embodiment of the present invention. The difference between the present embodiment and the first embodiment is that the current detecting unit 261 of the control circuit according to the present embodiment is coupled between the second terminal of the inductor L and the node P. The rest is the same as the first embodiment. Hence, the details will not be described again.

Because the current flowing through the inductor L increases as the stored charged energy increases, as shown in FIG. 5, according to the present embodiment, a charging current $I_C$ flowing through the inductor L is detected in the charging time $T_{C1}$, $T_{C2}$, or $T_{C3}$ for judging if charging of the inductor L has completed. This is different from the first embodiment, in which the charging times $T_{C1}$, $T_{C2}$, $T_{C3}$ are predetermined to be identical. The waveforms of the present embodiment are the same as those in FIG. 6. In the time $T_1$ or the discharging times $T_{DC1}$, $T_{DC2}$, $T_{DC3}$, as in the first Embodiment, the switch $SW_1$ is turned off and the switch $SW_2$ is turned on. Thereby, the current detecting unit 261 detects the output current $I_O$ for judging if the inductor L has completed discharging. In the charging time $T_{C1}$, $T_{C2}$, or $T_{C3}$, because the switch $SW_1$ is turned on and the switch $SW_2$ is turned off, the current detecting unit 261 changes to detect the charging current $I_C$. When the charging current $I_C$ is higher than a predetermined value, the current detecting unit 261 outputs the low-level current detecting signal IS, which makes the control unit 265 to turn off the switch $SW_1$ and turn on the switch $SW_2$ for finishing the charging time $T_{C1}$, $T_{C2}$, or $T_{C3}$.

Figure 8:
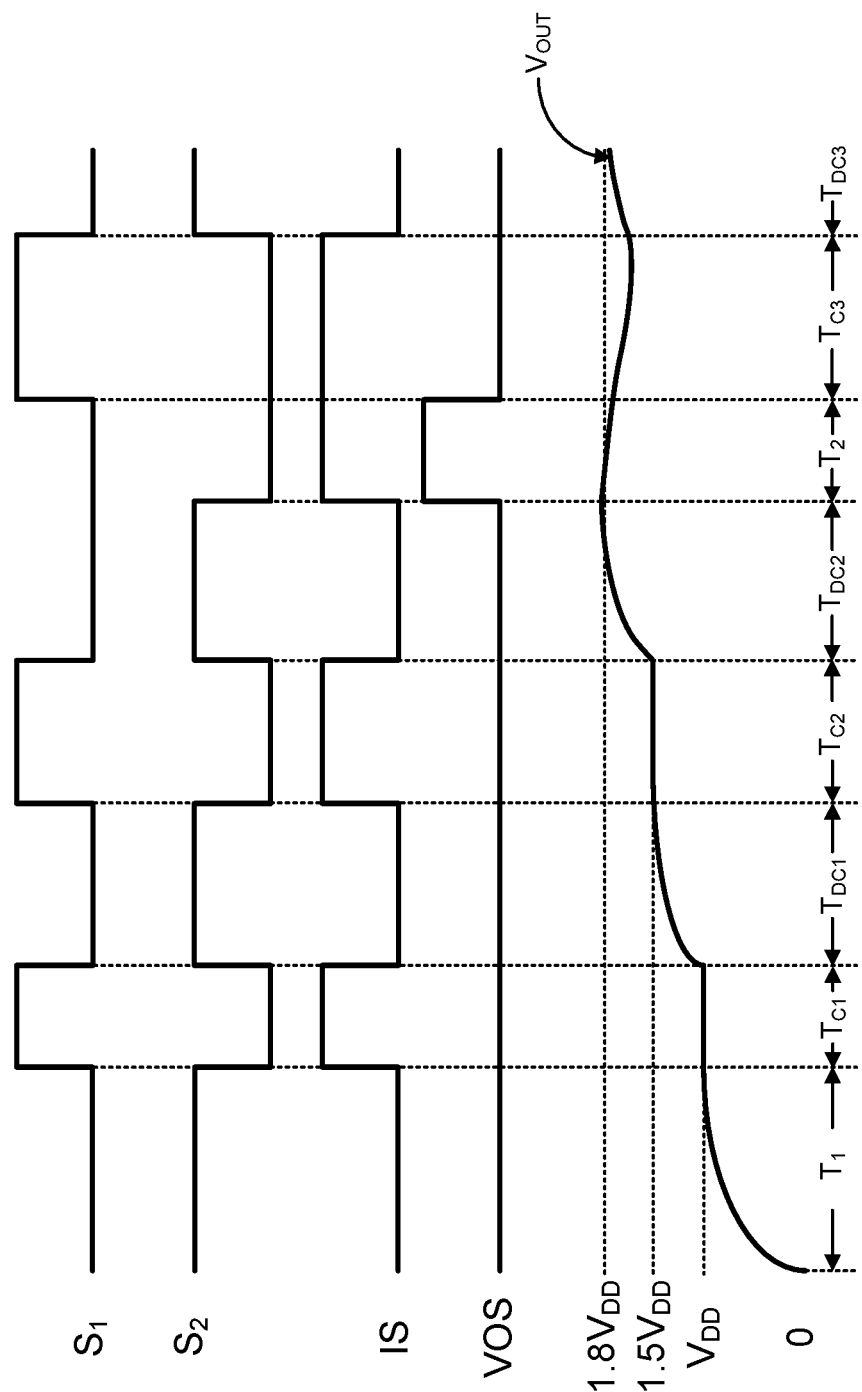
FIG. 8 shows waveforms of the voltage boosting circuit capable of modulating duty cycle automatically according to the third embodiment of the present invention.

Please refer to FIG. 8, which shows waveforms of the voltage boosting circuit capable of modulating duty cycle automatically according to the third embodiment of the present invention. The circuit diagram according to the present embodiment is the same as FIG. 7 according to the second embodiment. The difference is that the discharging times $T_{DC1}$, $T_{DC2}$, or $T_{DC3}$ are predetermined and fixed. In addition, the current detecting unit 261 detects the current value of the output current $I_O$ when the discharging times $T_{DC1}$, $T_{DC2}$, $T_{DC3}$ are finished for knowing if the charged energy stored in the inductor L during the previous charging time $T_{C1}$, $T_{C2}$, or $T_{C3}$ is too much or too few. If so, the predetermined value of the current detecting unit 261 is adjusted for further adjusting the charging time.

As shown in the figure, when the time $T_1$ is passed and the output voltage $V_{OUT}$ is charged to the level of the input power $V_{DD}$, the current detecting unit 261 detects that the output current $I_O$ is 0 A and outputs the high-level current detecting signal IS, which makes the control unit 265 output the high-level switching signal $S_1$ and the low-level switching signal $S_2$ for turning on the switch $SW_1$ and turning off the switch $SW_2$ and entering the charging time $T_{C1}$ to charge the inductor L by the input power $V_{DD}$. When the charging current $I_C$ is higher than the predetermined value, it means completion of charging; the current detecting unit 261 outputs the low-level current detecting signal IS to the control unit 265 to make the control unit 265 output the low-level switching signal $S_1$ and the high-level switching signal $S_2$ for turning off the switch $SW_1$ and turning on the switch $SW_2$ and entering the discharging time $T_{DC1}$. After the fixed and predetermined discharging time $T_{DC1}$, the current detecting unit 261 adjusts its predetermined value according to the output current $I_O$ at the moment. According to the present embodiment, the output current $I_O$ after the discharging time $T_{DC1}$ is smaller than a threshold value of the current detecting unit 261, which means that the charged energy stored in the inductor L during the charging time $T_{C1}$ is too few. Thereby, the predetermined value of the current detecting unit 261 is adjusted higher, namely, increasing the next charging time $T_{C2}$.

Because the predetermined value of the current detecting unit 261 is adjusted higher, the charging time $T_{C2}$ will be longer than the charging time $T_{C1}$, making the charged energy stored in the inductor L more. After the charging time $T_{C2}$ is finished, the discharging time $T_{DC2}$ starts. As the output voltage $V_{OUT}$ is higher than the predetermined voltage, 1.8 times the input power $V_{DD}$, the output-voltage detecting unit 263 also outputs the high-level output-voltage detecting signal VOS for turning off the switches $SW_1$, $SW_2$ simultaneously and entering the stop time $T_2$. When the output voltage $V_{OUT}$ decreases below the predetermined voltage, the output voltage-detecting signal VOS is changed to low for turning on the switch $SW_1$ and turning off the switch $SW_2$ and entering the charging time $T_{C3}$. Then the input power $V_{DD}$ will charge the inductor L again.

According to the above description, the voltage boosting circuit 26 according to the present embodiment uses the fixed predetermined discharging times $T_{DC1}$, $T_{DC2}$, $T_{DC3}$ to discharge the inductor L to the output. When the discharging time $T_{DC1}$, $T_{DC2}$, or $T_{DC3}$ is finished, the current detecting unit 261 is used for detecting the output current $I_O$. If the output current $I_O$ is greater than the threshold value, it means that the charging time is too long and the charged energy is too much. Then the predetermined value of the current detecting unit 261 is adjusted lower. If the output current $I_O$ is smaller than the threshold value, it means that the charging time is too short and the charged energy is too few. Then the predetermined value of the current detecting unit 261 is adjusted higher for adjusting the charging time of the inductor L.

When the threshold value of the current detecting unit 261 is set to 0 A and the discharging time $T_{DC1}$, $T_{DC2}$, or $T_{DC3}$ is finished, if there is still the output current $I_O$, it means that the charging time is too long and the charged energy is too much; if there is no output current $I_O$, it means that the charging time is too short and the charged energy is too few.

Figure 9:
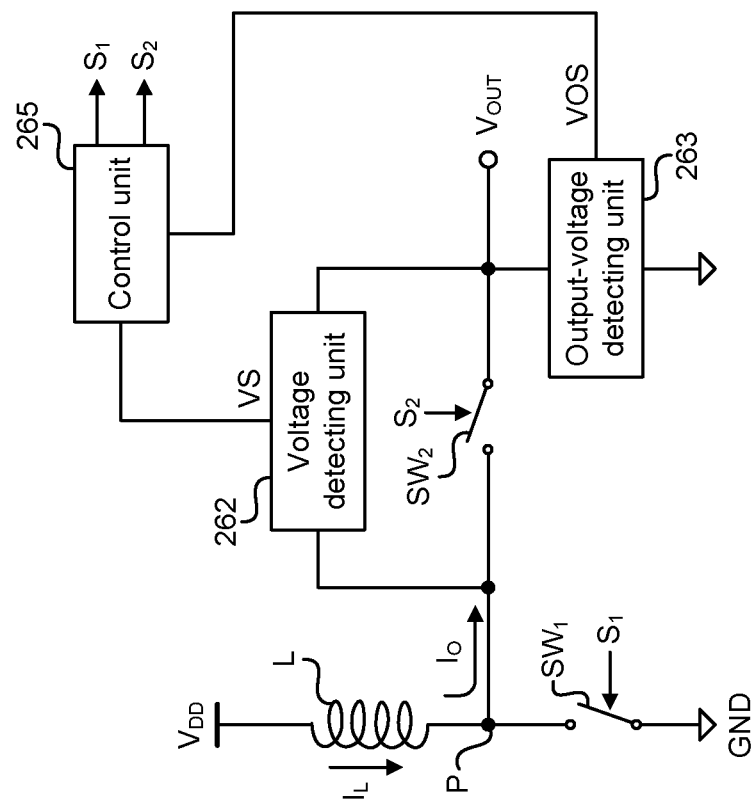
FIG. 9 shows a circuit diagram of the voltage boosting circuit capable of modulating duty cycle automatically according to the fourth embodiment of the present invention.
Figure 10:
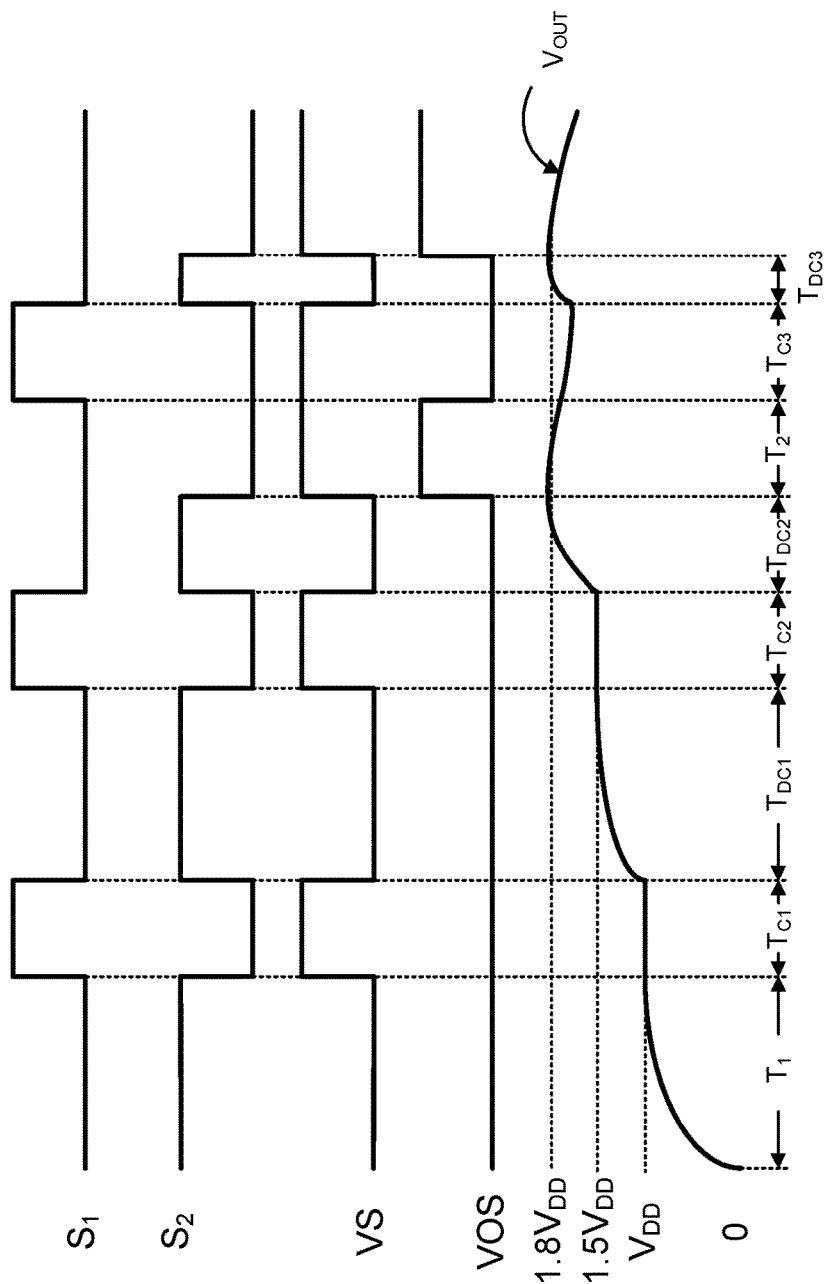
FIG. 10 shows waveforms of the voltage boosting circuit capable of modulating duty cycle automatically according to the fourth embodiment of the present invention.

Please refer to FIGS. 9 and 10. FIG. 9 shows a circuit diagram of the voltage boosting circuit capable of modulating duty cycle automatically according to the fourth embodiment of the present invention; FIG. 10 shows waveforms of the voltage boosting circuit capable of modulating duty cycle automatically according to the fourth embodiment of the present invention. The difference between the present embodiment and the first embodiment is that according to the present embodiment, a voltage detecting unit 262 replaces the current detecting unit 261 according to the first embodiment. The rest circuit and principle are the same as the first embodiment. Hence, the details will not be described again.

As shown in the figure, the voltage detecting unit 262 is coupled to the node P and the output. After the time $T_1$, when the output voltage $V_{OUT}$ is charged to the level of the input power $V_{DD}$, because the voltage levels of the input and the output of the voltage boosting circuit 26 are identical, there will be no current passing between the two nodes. Accordingly, the voltage detecting unit 262 will detect no voltage difference between the node P and the output and output the high-level voltage detecting signal VS, which makes the control unit 265 to output the high-level switching signal $S_1$ and the low-level switching signal $S_2$ for turning on the switch $SW_1$ and turning off the switch $SW_2$ and entering the charging time $T_{C1}$. Besides, as described in the first embodiment, after the discharging time $T_{DC1}$ and discharging of the charged energy in the inductor L to the output has finished, the voltage level of the node P is equal to the output voltage $V_{OUT}$. Thereby, the voltage detecting unit 262 will also detect no voltage difference between the node P and the output and output the high-level voltage detecting signal VS. The rest can be deduced by analogy. According to the above description, the first embodiment uses the method of detecting current, while the present embodiment uses the method of detecting voltage for judging if discharging of the inductor L has finished or not.

Figure 11:
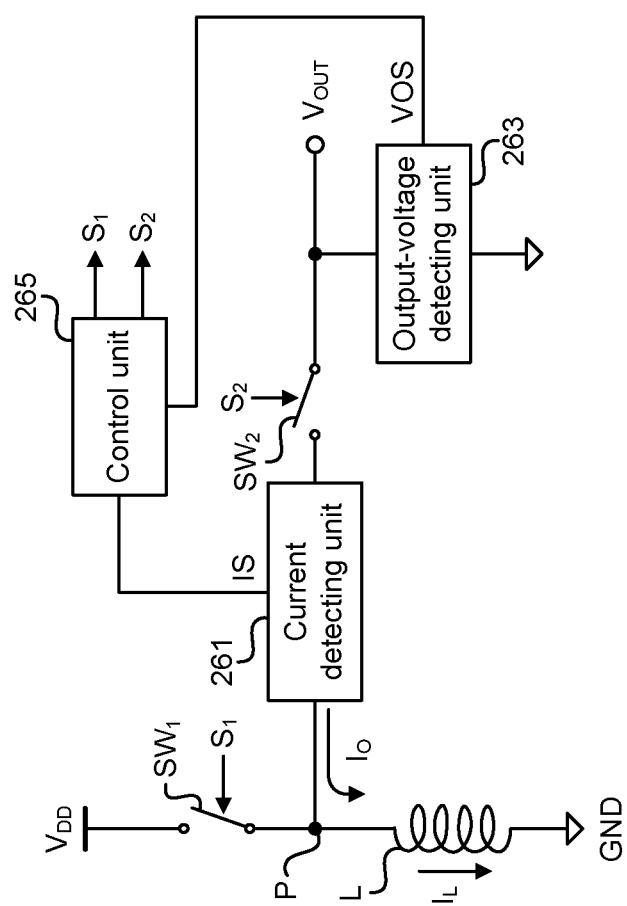
FIG. 11 shows a circuit diagram of the voltage boosting circuit capable of modulating duty cycle automatically according to the fifth embodiment of the present invention.
Figure 12:
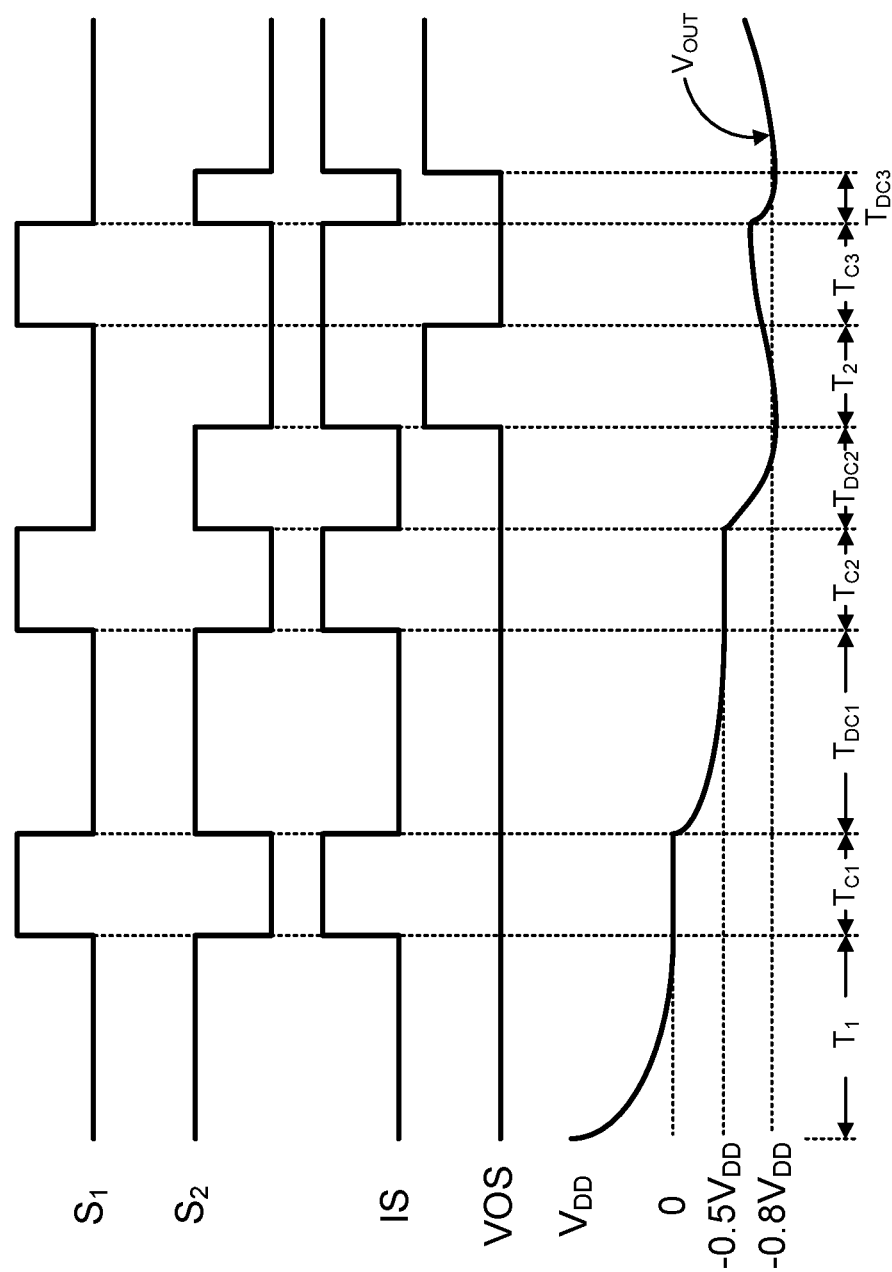
FIG. 12 shows waveforms of the voltage boosting circuit capable of modulating duty cycle automatically according to the fifth embodiment of the present invention.

Please refer to FIGS. 11 and 12. FIG. 11 shows a circuit diagram of the voltage boosting circuit capable of modulating duty cycle automatically according to the fifth embodiment of the present invention; FIG. 12 shows waveforms of the voltage boosting circuit capable of modulating duty cycle automatically according to the fifth embodiment of the present invention. As shown in FIG. 11, the difference between the present embodiment and the first embodiment is the connection of the inductor L with and switching module. The first terminal of the inductor L is coupled to the ground GND; the switch $SW_1$ of the switching module is coupled between the input power $V_{DD}$ and the second terminal of the inductor L. The rest is the same as the first embodiment.

As shown in FIG. 12, initially, the level of the output voltage $V_{OUT}$ is unknown. It could be any level between the input power $V_{DD}$ and the ground GND. Assuming that the output voltage $V_{OUT}$ is equal to the input power $V_{DD}$, which is greater than the level of the ground GNS (0V), the control unit 265 will output the low-level switching signal $S_1$ and the high-level switching signal $S_2$ for turning off the switch $SW_1$ and turning on the switch $SW_2$. Consequently, in the time $T_1$, the output will discharge to the ground GND via the inductor L, and thus making the output voltage $V_{OUT}$ decrease to 0V of the ground GND. At this moment, because the voltage levels of the output and the ground GND are identical, there will be no current flowing between the two nodes. Hence, the current detecting unit 261 will detect the output current $I_O$ to be 0 A and output the high-level current detecting signal $S_1$, which makes the control unit 265 output the high-level switching signal $S_1$ and the low-level switching signal $S_2$ for turning on the switch $SW_1$ and turning off the switch $SW_2$. Thereby, the input power $V_{DD}$ will charge the inductor L for the charging time $T_{C1}$ for producing the charged energy.

After charging is finished, the switching signal $S_1$ is changed to low and the switching signal $S_2$ is changed to high for turning off the switch $SW_1$ and turning on the switch $SW_2$ and entering the discharging time $T_{DC1}$. At this moment, the first terminal of the inductor L is coupled to the ground GND and the second terminal thereof generates a negative voltage. At the transient when the switch $SW_2$ is turned on, the output will discharge to the ground GND via the switch $SW_2$ and the inductor L. The voltage across the inductor L will increase rapidly and then decrease gradually as discharging to the ground GND proceeds. The output voltage $V_{OUT}$ of the output will also decrease gradually. In addition, like in the first embodiment, after discharging of the inductor L is finished, namely, when the output current $I_O$ is zero, the voltage level of the node P will be equal to the level of the output voltage $V_{OUT}$, which is equal to minus 0.5 times the input power $V_{DD}$.

When the voltage level of the node P is equal to the level of the output voltage $V_{OUT}$, the current detecting unit 261 detects the output current $I_O$ to be 0 A, which makes the control unit 265 to turn on the switch $SW_1$ and turn off the switch $SW_2$ using the switching signals $S_1$, $S_2$. Then the input power $V_{DD}$ charges the inductor L for the charging time $T_{C2}$. After charging is finished, the switching signal $S_1$ is changed to low and the switching signal $S_2$ is changed to high for turning off the switch $SW_1$ and turning on the switch $SW_2$ and entering the discharging time $T_{DC2}$, in which the inductor L discharges to the ground GND. Because the predetermined voltage according to the present embodiment is minus 0.8 times the input power $V_{DD}$, as the output voltage $V_{OUT}$ decreases below minus 0.8 times the input power $V_{DD}$, the output-voltage detecting unit 263 outputs the high-level output-voltage detecting signal VOS to make the control unit 265 output the low-level switching signals $S_1$, $S_2$ simultaneously for turning off the switches $SW_1$, $SW_2$ at the same time. Thereby, charging and discharging of the voltage boosting circuit 26 are stopped and entering the stop time $T_2$.

In the stop time $T_2$, the voltage boosting circuit 26 does not charge or discharge. Hence, if there is power consumption at the output, the output voltage $V_{OUT}$ will increase gradually. When the output voltage $V_{OUT}$ is higher than the predetermined voltage, the output-voltage detecting unit 263 changes the output-voltage detecting signal VOS to low according to the output voltage $V_{OUT}$. Thereby, the switching signal $S_1$ is changed to high and the switching signal $S_2$ is kept low for turning on the switch $SW_1$ and turning off the switch $SW_2$. After the input power $V_{DD}$ restarts to charge the inductor L for the charging time $T_{C3}$, the switching signal $S_1$ is changed to low and the switching signal $S_2$ is changed to high and entering the discharging time $T_{DC3}$, in which the inductor L discharges to the ground GND until the output voltage $V_{OUT}$ is lower than the predetermined voltage again. Then the output-voltage detecting signal VOS is changed to high for turning off the switches $SW_1$, $SW_2$ again.

According to the above description, the principle of the voltage boosting circuit 26 according to the present embodiment is the same as that according to the first embodiment, in which the fixed predetermined charging times $T_{C1}$, $T_{C2}$, $T_{C3}$ are used to charge the inductor L to the same charged energy. In addition, in each of the discharging times $T_{DC1}$, $T_{DC2}$, $T_{DC3}$, the charge energy is discharged completely to the ground GND and decreasing the output voltage $V_{OUT}$ gradually. As the output voltage $V_{OUT}$ decreases, each of the discharging times $T_{DC1}$, $T_{DC2}$, $T_{DC3}$ becomes shorter. In addition, by using the connection of the inductor L and the switch $SW_1$ according to the present embodiment, the output voltage $V_{OUT}$ at the output can be negative.

Figure 13:
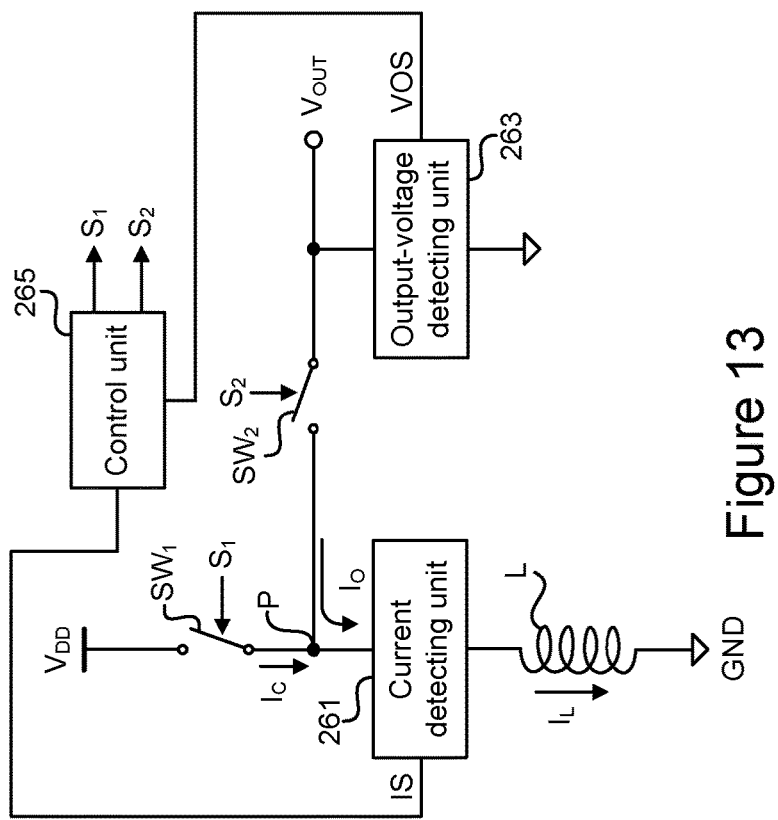
FIG. 13 shows a circuit diagram of the voltage boosting circuit capable of modulating duty cycle automatically according to the sixth embodiment of the present invention.

Please refer to FIG. 13, which shows a circuit diagram of the voltage boosting circuit capable of modulating duty cycle automatically according to the sixth embodiment of the present invention. The present embodiment combines the second and fifth embodiments. According to the present embodiment, the current detecting unit 261 of the control circuit is coupled between the second terminal of the inductor L and the node P.

Like the second embodiment, according to the present embodiment, the charging current $I_C$ flowing through the inductor L is detected in the charging time $T_{C1}$, $T_{C2}$, or $T_{C3}$ for judging if charging of the inductor L has completed. This is different from the fifth embodiment, in which the charging times $T_{C1}$, $T_{C2}$, $T_{C3}$ are predetermined. The waveforms according the present embodiment are the same as FIG. 12. In the time $T_1$ or the discharging times $T_{DC1}$, $T_{DC2}$, $T_{DC3}$, like the fifth embodiment, the switch $SW_1$ is turned off and the switch $SW_2$ is turned on. Hence, the current detecting unit 261 detects the output current $I_O$ for judging if charging of the inductor L has completed. In the charging times $T_{C1}$, $T_{C2}$, $T_{C3}$, because the switch $SW_1$ is turned on and the switch $SW_2$ is turned off, the current detecting unit 261 changes to detect the charging current $I_C$. As the charging current $I_C$ is higher than the predetermined value, the current detecting unit 261 outputs the low-level current detecting signal IS for making the control unit 265 turn off the switch $SW_1$ and turn on the switch $SW_2$ for finishing the charging time $T_{C1}$, $T_{C2}$, or $T_{C3}$.

Figure 14:
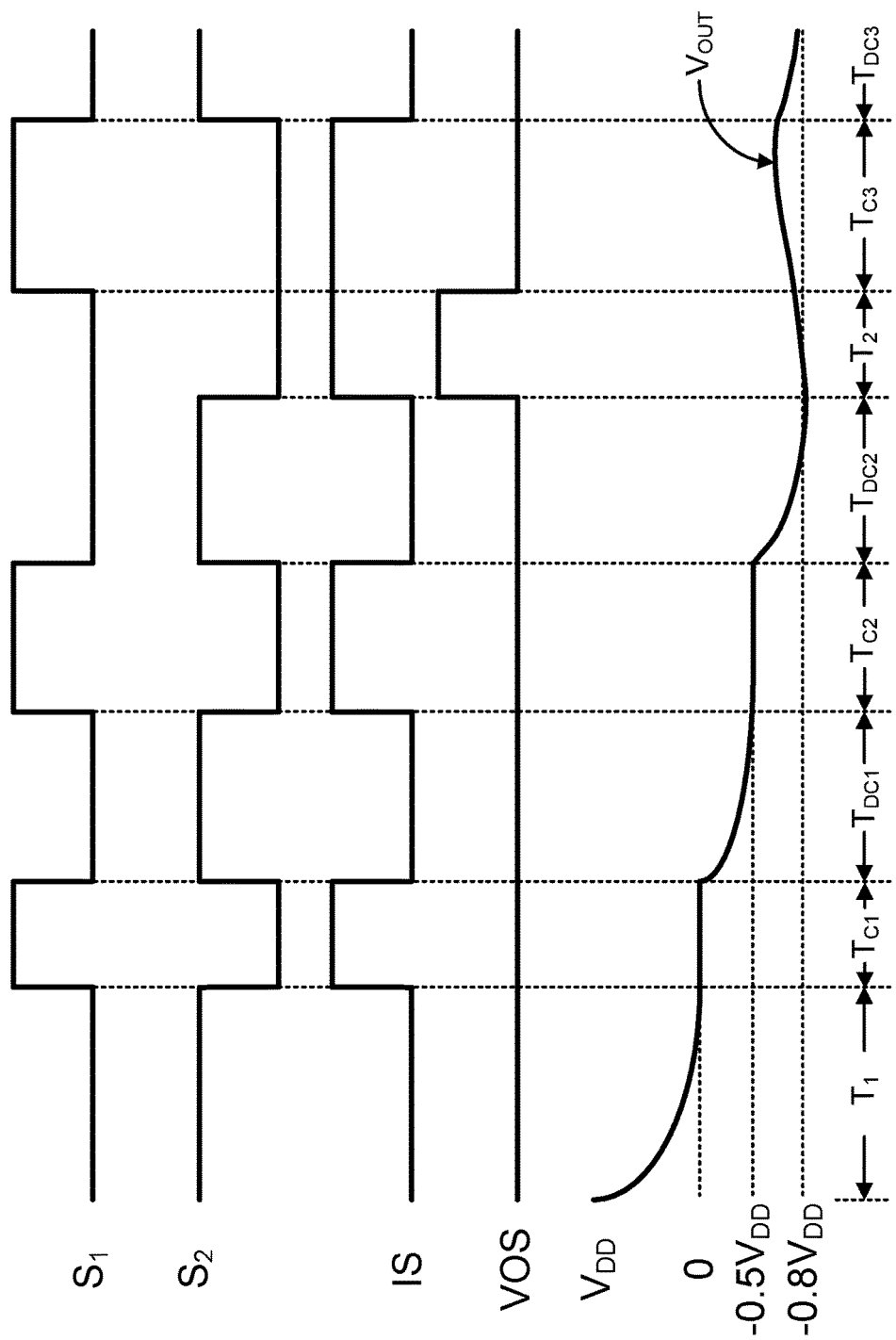
FIG. 14 shows waveforms of the voltage boosting circuit capable of modulating duty cycle automatically according to the seventh embodiment of the present invention.

Please refer to FIG. 14, which shows waveforms of the voltage boosting circuit capable of modulating duty cycle automatically according to the seventh embodiment of the present invention. The circuit diagram according to the present embodiment is identical to FIG. 13 according to the sixth embodiment. The difference is that the discharging times $T_{DC1}$, $T_{DC2}$, $T_{DC3}$ according to the present embodiment are predetermined and fixed. Besides, the current detecting unit 261 is used for the output current $I_O$ when the discharging times $T_{DC1}$, $T_{DC2}$, $T_{DC3}$ are finished for knowing that the charged energy stored in the inductor L is too much or too few. If the charged energy is too much or too few, the predetermined value of the current detecting unit 261 is adjusted and thus further adjusting the charging time. The principle of this part is like the third embodiment. The voltage boosting circuit 26 according to the present embodiment enables the inductor L to discharge to the output in fixed and predetermined discharging times $T_{DC1}$, $T_{DC2}$, $T_{DC3}$. When the discharging times $T_{DC1}$, $T_{DC2}$, $T_{DC3}$ are finished, the current detecting unit 261 is used for detecting the output current $I_O$. If the output current $I_O$ is greater than the threshold value, it means that the charging time is too long and the charged energy is too much, then the predetermined value of the current detecting unit 261 is adjusted lower; if the output current $I_O$ is smaller than the threshold value, it means that the charging time is too short and the charged energy is too few. Then the predetermined value of the current detecting unit 261 is adjusted higher. If there is no output current $I_O$, it means that the charging time is too short and the charged energy is too few. Hence, the predetermined value of the current detecting unit 261 is adjusted higher for adjusting the charging time of the inductor L.

Figure 15:
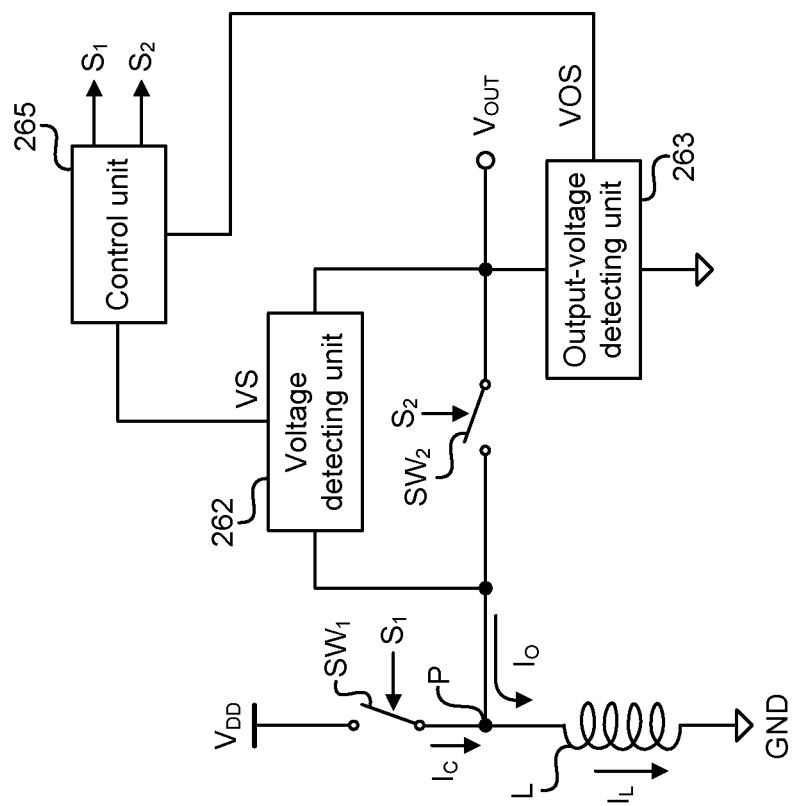
FIG. 15 shows a circuit diagram of the voltage boosting circuit capable of modulating duty cycle automatically according to the eighth embodiment of the present invention.
Figure 16:
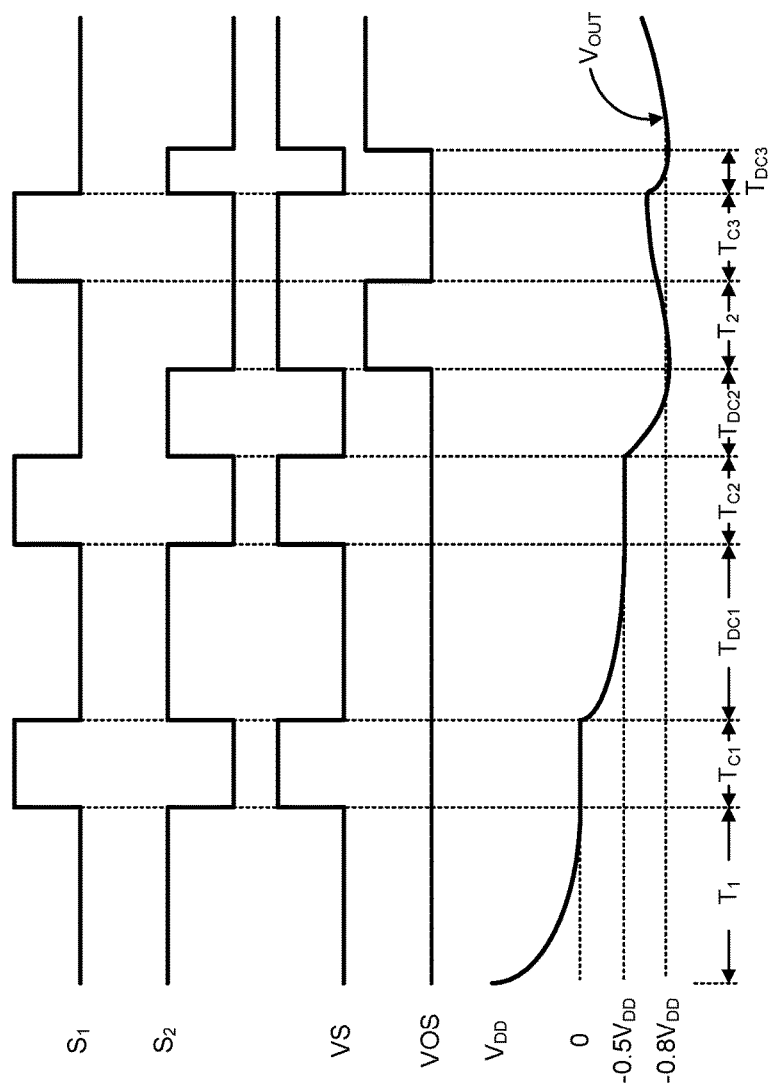
FIG. 16 shows waveforms of the voltage boosting circuit capable of modulating duty cycle automatically according to the eighth embodiment of the present invention.

Please refer to FIGS. 15 and 16. FIG. 15 shows a circuit diagram of the voltage boosting circuit capable of modulating duty cycle automatically according to the eighth embodiment of the present invention; FIG. 16 shows waveforms of the voltage boosting circuit capable of modulating duty cycle automatically according to the eighth embodiment of the present invention. The difference between the present embodiment and the fifth embodiment is that the voltage detecting unit 262 according to the present embodiment replaces the current detecting unit 261 according to the fifth embodiment. The rest circuit and the principle are the same as the fifth embodiment. Hence, the details will not be described again.

As shown in FIG. 16, after the time $T_1$, when the output voltage $V_{OUT}$ is discharged to the level of the ground GND, because the voltage levels of the output and the ground GND are the same, there will be no current flowing between the two nodes. Accordingly, the voltage detecting unit 262 will detect no voltage difference between the node P and the output and output the high-level voltage detecting signal VS, which makes the control unit 265 to output the high-level switching signal $S_1$ and the low-level switching signal $S_2$ for turning on the switch $SW_1$ and turning off the switch $SW_2$ and entering the charging time $T_{C1}$. Besides, as described in the fifth embodiment, after the discharging time $T_{DC1}$ and discharging of the charged energy in the inductor L to the output has finished, the voltage level of the node P is equal to the output voltage $V_{OUT}$. Thereby, the voltage detecting unit 262 will also detect no voltage difference between the node P and the output and output the high-level voltage detecting signal VS. The rest can be deduced by analogy.

To sum up, the voltage boosting circuit capable of modulating duty cycle automatically according to the present invention knows whether the inductor has completed charging or discharging or whether the output voltage has reached the predetermined voltage by using the control circuit to detect the charged energy and the output voltage of the inductor. Then the switching module is controlled according to the detection result to switch for switching the inductor automatically to charge, discharge, or stop charging and discharging and thus modulating the duty cycle of the voltage boosting circuit automatically. Thereby, the purposes of reducing power consumption and saving power can be achieved.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A voltage boosting circuit capable of modulating duty cycle automatically, comprising:
    an inductor, having a first terminal and a second terminal, and said first terminal of said inductor coupled to a ground;
    a switching module, coupled among said second terminal of said inductor, an input terminal, and an output terminal of said voltage boosting circuit, used for switching to couple said second terminal of said inductor and said input terminal for enabling said inductor to receive a power supply voltage and charge said inductor for producing a charged energy, or used for switching to couple said second terminal of said inductor and said output terminal for enabling said charged energy of said inductor to discharge to said ground and produce an output voltage; and
    a control circuit, outputting at least one control signal according to a capacity of said charged energy and said output voltage for controlling said switching module to switch and enable said output terminal to discharge to said ground, controlling said switching module to switch and enable said charged energy of said inductor to discharge to said ground, or controlling said switching module to switch and enable said power supply voltage to charge said inductor;
    wherein when said output voltage is higher than a voltage level of said ground, said control circuit controls said switching module to switch said output terminal for discharging to said ground.

2. The voltage boosting circuit of claim 1, wherein said switching module comprises:
    a first switch, coupled between said second terminal of said inductor and said input terminal, and turned on according to a first switching signal of said at least the one control signal for connecting said second terminal of said inductor to said input terminal; and
    a second switch, coupled between said second terminal of said inductor and said output terminal of said voltage boosting circuit, and turned on according to a second switching signal of said at least the one control signal for connecting said second terminal of said inductor to said output terminal of said voltage boosting circuit.

3. The voltage boosting circuit of claim 1, wherein said control circuit comprises:
    a current detecting unit, detecting an output current between said second terminal of said inductor and said output terminal of said voltage boosting circuit for knowing the capacity of said charged energy, and generating a current detecting signal according to said output current;
    an output-voltage detecting unit, detecting said output voltage, and generating an output-voltage detecting signal according to said output voltage; and
    said control circuit outputting said at least the one control signal according to said current detecting signal and said output-voltage detecting signal.

4. The voltage boosting circuit of claim 1, wherein said control circuit comprises:
    a current detecting unit, detecting a charging current between said input terminal and said second terminal of said inductor, and generating a current detecting signal when said charging current is higher than a predetermined value;
    an output-voltage detecting unit, detecting said output voltage, and generating an output-voltage detecting signal according to said output voltage; and
    said control circuit, outputting said at least the one control signal according to said current detecting signal and said output-voltage detecting signal.

5. The voltage boosting circuit of claim 4, wherein when said charging current is higher than said predetermined value, said current detecting unit outputs said current detecting signal for enabling said control circuit to turn on the path between said second terminal of said inductor and said output terminal of said voltage boosting circuit for finishing a charging time.

6. The voltage boosting circuit of claim 4, wherein when said charged energy of said inductor discharges to said ground for a discharging time, said current detecting unit detects an output current between said second terminal of said inductor and said output terminal of said voltage boosting circuit; if said output current is greater than a threshold value, said current detecting unit adjusts said predetermined value lower; and if said output current is less than or equal to said threshold value, said current detecting unit adjusts said predetermined value higher.

7. The voltage boosting circuit of claim 1, wherein said control circuit comprises:
    a voltage detecting unit, detecting if a voltage level of said charged energy is equal to said output voltage, and generating a voltage detecting signal according to the voltage level of said charged energy;
    an output-voltage detecting unit, detecting said output voltage, and generating an output-voltage detecting signal according to said output voltage; and
    said control circuit, outputting said at least the one control signal according to said voltage detecting signal and said output-voltage detecting signal.

8. A voltage boosting circuit capable of modulating duty cycle automatically, comprising:
    an inductor, having a first terminal and a second terminal, and said first terminal of said inductor coupled to a ground;
    a switching module, coupled among said second terminal of said inductor, an input terminal, and an output terminal of said voltage boosting circuit, used for switching to couple said second terminal of said inductor and said input terminal for enabling said inductor to receive a power supply voltage and charge said inductor for producing a charged energy, or used for switching to couple said second terminal of said inductor and said output terminal for enabling said charged energy of said inductor to discharge to said ground and produce an output voltage; and a control circuit, outputting at least one control signal according to a capacity of said charged energy and said output voltage for controlling said switching module to switch and enable said output terminal to discharge to said ground, controlling said switching module to switch and enable said charged energy of said inductor to discharge to said ground, or controlling said switching module to switch and enable said power supply voltage to charge said inductor;

wherein when said output voltage is lower than a predetermined voltage, said switching module turns off a path between said second terminal of said inductor and said input terminal and a path between said second terminal of said inductor and said output terminal of said voltage boosting circuit according to said at least the one control signal.

9. The voltage boosting circuit of claim 8, wherein said switching module comprises:
   a first switch, coupled between said second terminal of said inductor and said input terminal, and turned on according to a first switching signal of said at least the one control signal for connecting said second terminal of said inductor to said input terminal; and
   a second switch, coupled between said second terminal of said inductor and said output terminal of said voltage boosting circuit, and turned on according to a second switching signal of said at least the one control signal for connecting said second terminal of said inductor to said output terminal of said voltage boosting circuit.

10. The voltage boosting circuit of claim 8, wherein said control circuit comprises:
    a current detecting unit, detecting an output current between said second terminal of said inductor and said output terminal of said voltage boosting circuit for knowing the capacity of said charged energy, and generating a current detecting signal according to said output current;
    an output-voltage detecting unit, detecting said output voltage, and generating an output-voltage detecting signal according to said output voltage; and
    said control circuit outputting said at least the one control signal according to said current detecting signal and said output-voltage detecting signal.

11. The voltage boosting circuit of claim 8, wherein said control circuit comprises:
    a current detecting unit, detecting a charging current between said input terminal and said second terminal of said inductor, and generating a current detecting signal when said charging current is higher than a predetermined value;
    an output-voltage detecting unit, detecting said output voltage, and generating an output-voltage detecting signal according to said output voltage; and
    said control circuit, outputting said at least the one control signal according to said current detecting signal and said output-voltage detecting signal.

12. The voltage boosting circuit of claim 11, wherein when said charging current is higher than said predetermined value, said current detecting unit outputs said current detecting signal for enabling said control circuit to turn on the path between said second terminal of said inductor and said output terminal of said voltage boosting circuit for finishing a charging time.

13. The voltage boosting circuit of claim 11, wherein when said charged energy of said inductor discharges to said ground for a discharging time, said current detecting unit detects an output current between said second terminal of said inductor and said output terminal of said voltage boosting circuit; if said output current is greater than a threshold value, said current detecting unit adjusts said predetermined value lower; and if said output current is less than or equal to said threshold value, said current detecting unit adjusts said predetermined value higher.

14. The voltage boosting circuit of claim 8, wherein said control circuit comprises:
    a voltage detecting unit, detecting if a voltage level of said charged energy is equal to said output voltage, and generating a voltage detecting signal according to the voltage level of said charged energy;
    an output-voltage detecting unit, detecting said output voltage, and generating an output-voltage detecting signal according to said output voltage; and
    said control circuit, outputting said at least the one control signal according to said voltage detecting signal and said output-voltage detecting signal.

* * * * *